Patented Aug. 28, 1951

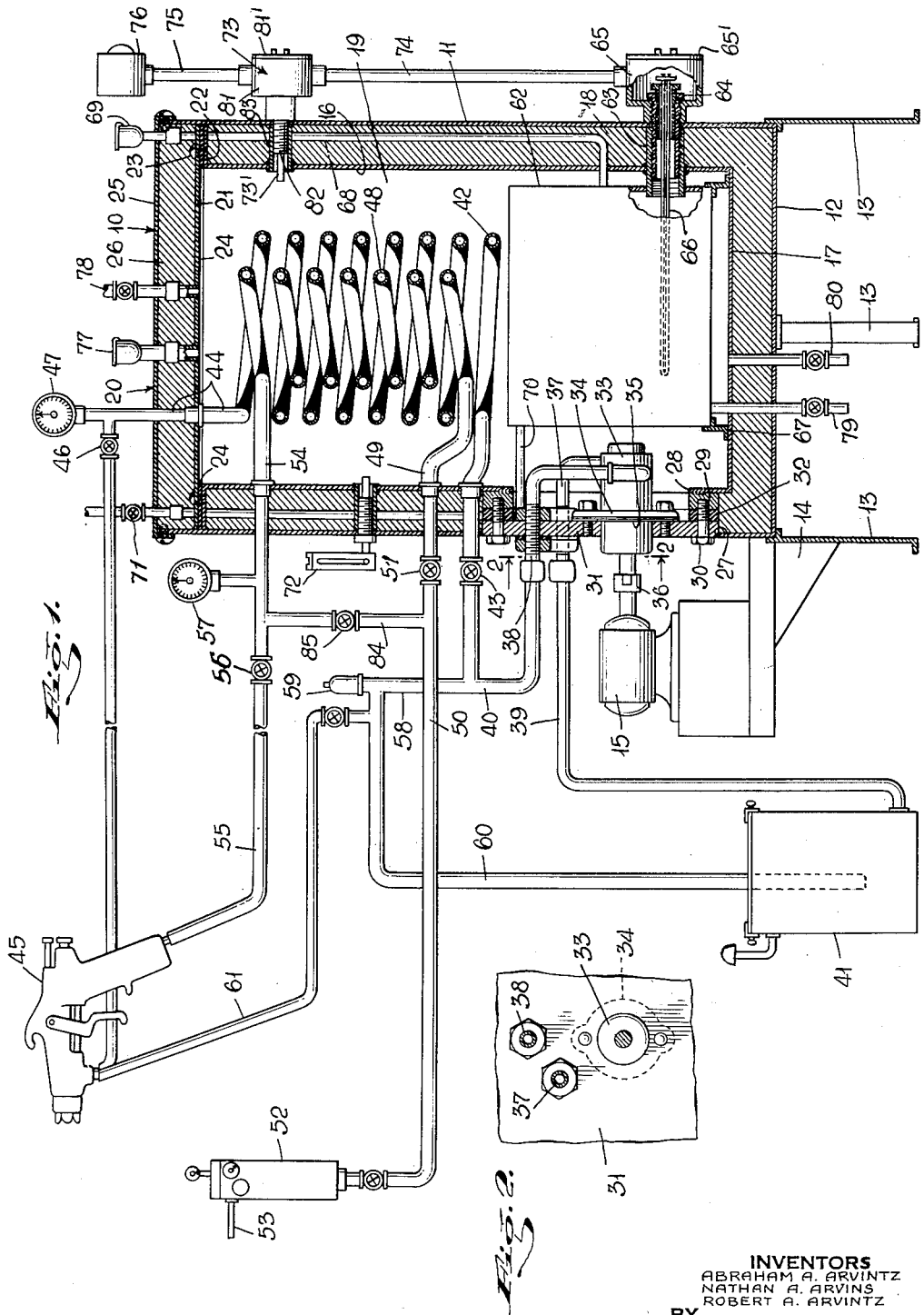

2,565,543

UNITED STATES PATENT OFFICE 2,565,543

FLUID PREHEATING AND DISPENSING APPARATUS

Abraham A. Arvintz and Nathan A. Arvins, Brooklyn, and Robert A. Arvintz, New York, N. Y., assignors to Reliable Products Manufacturing Co., Inc., Brooklyn, N. Y., a corporation of New York Application February 3, 1949, Serial No. 74,382

13 Claims. (Cl. 219—39)

1

This invention relates to apparatus for preheating fluids of various types and kinds preparatory to delivery to a source or discharge means, such for example, as the preheating of paints, lacquers, enamels and the like and the discharge thereof from a spray gun. More particularly, the invention deals with apparatus of this type and kind, wherein the circulating pump for circulating the fluid is exposed in the heating apparatus to avoid any congestion or clogging of the fluid in the pump, and particularly in maintaining intermittent operation of the apparatus. Still more particularly, the invention deals with apparatus of the character described employing electric heating means readily accessible through one side of the apparatus.

The novel features of the invention will be best understood from the following descriptions when taken together with the accompanying drawing in which certain embodiments of the invention are disclosed, and in which the separate parts are designated by suitable reference characters in each of the views, and in which:

Fig. 1 is a sectional view through an apparatus made according to my invention, diagrammatically illustrating a use thereof; and Fig. 2 is a detailed sectional view substantially on the line 2—2 of Fig. 1.

In the drawing, I have shown a sectional view through a preheater unit 10, the unit comprising a main outer casing 11 which is open at the top and includes a bottom wall 12. The casing is supported above a floor or other surface by suitable leg members 13, one of which includes a bracket portion 14 supporting an electric motor 15, outwardly of the casing 11.

Within the casing 11 is an inner casing or cylinder 16, also open at the top and including a bottom wall 17. Between the two casings is disposed suitable insulating material, as indicated at 18. Within the cylinder or inner casing 16 is a heat transfer chamber 19 containing a suitable heat transfer fluid or medium, preferably capable of being heated to relatively high temperatures without reaching a boiling point.

The upper open ends of the casings 11 and 16 are closed by a cover member 20. This member comprises a plate 21 secured to an outer flange portion 22 on the inner casing 16 by screws, as seen at 23, a gasket 24 being disposed between the plate 21 and flange 22. An upper flanged lid 25 is mounted on the outer casing 11 and supports between it and the plate 21, insulating material 26. It will thus be seen that upon removing the lid 25, the insulating material 26 can be removed and then the plate 21 detached in removal of any of the mechanisms within the chamber 19.

Both of the casings 11 and 16 have registering openings at the lower portion thereof, the opening 27 in the outer casing being of larger dimensions than the opening 28 in the inner casing. Welded to the inner casing 16 is a ring 29 having a series of apertures to receive screws 30 in securing a closure plate 31 within the opening 27. A gasket 32 is employed between the plate 31 and the ring 29. Supported upon the inner surface of the plate 31 is a circulating pump 33, the flange 34 of which is secured to the plate and sealed, as seen at 35. The pump shaft is coupled with the motor shaft through a suitable coupling, as seen at 36. The pump 33 has intake and discharge pipes 37 and 38 respectively, which pass outwardly through the plate 31, through suitable fittings and couplings, which are diagrammatically shown. These pipes couple with other pipes 39 and 40, the pipe 39 extending to a liquid supply tank 41, whereas the pipe 40 leads to a coil 42 arranged in the chamber 19, a valve 43 being employed to control feed to the coil. The showing of the pipes or tubes is diagrammatic in the accompanying drawing, it being understood that suitable fittings and connections are employed for the various assemblages, but this is all well known in the art and is not shown in detail, in order to avoid unnecessary disclosure and this applies to other pipes and tubes, later described.

The upper discharge end 44 of the coil 42 extends through the cover 20 and leads to a spray gun, diagrammatically shown at 45 in the drawing. A control valve 46 is employed to control the supply of fluid to the gun and in the pipe 44 is employed a pressure indicator 47.

Also arranged in the chamber 19, within the coil 42, is another coil 48, the inlet end 49 of which is coupled with an air supply pipe 50 having a control valve 51. Air under pressure is supplied through suitable means 52 with which the pipe 50 is coupled, the means 52 having an inlet, as at 53. At 54 is shown the air discharge of the coil 48 which leads to a pipe or tube 55 coupled with the gun 45. A valve 56 is employed in the pipe or tube 55, as is also a pressure gauge 57.

The pipe 40 has an extension 58 in which is disposed a pressure relief valve 59 for automatically controlling discharge of surplus fluid beyond the demands for circulation through the coil 42, so this surplus can be returned to the tank 41 through a pipe 60. Also coupled with the pipe 60, is a return 61, from the gun 45, to return surplus fluid, not consumed in gun operation. In other words, with the apparatus, a continued circulation of fluid is provided through the coil 42 and gun back to the supply tank 41 and also from the pipe 40 through the pipe 58 back to the tank 41. Of course, if the gun consumes all of the fluid circulated, there would be no return. However, the apparatus is usually operated on a margin greater than that which would meet the requirements at the gun, which encourages the recirculation mentioned above.

Within the chamber 19 is arranged a heater compartment in the form of a tank 62. The tank is fixedly supported in the inner casing or cylinder 16 by a large nipple or tube 63, welded to the tank and to the casing 16, this nipple or tube 63 terminating short of the casing 16 and is internally threaded to receive a sleeve portion 64 with which a box 65 is also coupled. The sleeve portion 64 forms a sealed mounting for an electric heating element 66 in the tank 62. Another support, such for example, as a bracket 67 is employed to mount the tank 62 in the casing 16 in maintaining the bottom of the tank 62 above the bottom 17 of the casing. It will also be apparent that the tank 62 is spaced from all other walls of the casing.

In the tank is disposed a suitable heating fluid, preferably of the type that can be heated to a high temperature without reaching a boiling point or building-up pressures. At 68 is shown a pipe or tube for filling the tank 62 through a filling cup 69 disposed above the cover 20. At 70 is shown a pipe coupled with the upper end of the tank 62 and extending through the cover 20, and in the latter pipe, outwardly of the cover, is disposed on automatic relief valve 71, so as to exhaust any excess pressures that might prevail in the tank 62. This valve is also utilized as a vent for discharging air in the operation of filling the tank 62.

A thermometer 72 is arranged externally of the apparatus and extends into the chamber 19 in order to indicate the temperatures of the fluid therein. At 73 is shown a thermo-switch mechanism extending into the chamber 19 to automatically control operation of the heating element in maintaining predetermined temperatures in the fluid to be heated by gauging temperatures of the heating medium in the chamber 19. It will, of course, be understood that the positioning of the switch unit 73 is diagrammatically shown, and this is true of other parts, in order to avoid the showing of superfluous views in the drawing. In other words, the unit 73 or its control element 73', which extends into the chamber 19, is spaced circumferentially with respect to the pipe 68.

The unit 73 is coupled with the box 65 through a tube 74 which provides a means for extending the circuit wires from the unit 73 to the heating element 66. Another pipe 75 extends upwardly from the unit 73 to a pilot light 76 employed to indicate operations of the apparatus. At 77 is shown to fill cap for introducing the heating medium into the chamber 19 and at 78 is a combined petcock and check valve for venting the chamber 19 and for controlling automatic exhaust of excessive pressures that may prevail in the tank 19. At 79 is shown a valved pipe coupled with the tank 62 and extending through the bottom of the apparatus for draining the tank 62. A similar valved drain 80 is provided for the chamber 19.

The thermo-switch mechanism 73 is generally similar to the box 65. In other words, the casing 81 of this mechanism is coupled by a threaded sleeve 82 with a nipple portion 83, welded or otherwise secured to the casing 16, the nipple 83 and the sleeve 82 being generally similar to the structure of the nipple 63 and sleeve 64. Both of these structures facilitate detachment of the boxes and the electrical equipment whenever it is desired to remove the inner casing 16 from the outer casing. Each box 65 and 81, has a detachable cover 65' and 81' which facilitates detachment of the electrical mechanism, in other words, the heater 66 or the control element 73'.

In the accompanying drawing and foregoing description, the invention has been illustrated as utilized in the heating of fluids for supply to such apparatus as a spray gun. In such uses, paints, enamels, lacquers and similar coating materials or chemical coatings of any type or kind can be applied to or sprayed onto surfaces or articles of any kind. In this use, we have found that coating or surfacing materials can be produced having characteristics which accommodate heating at relatively high temperatures in producing advantageous results in the material as applied to the surface or article coated thereby. In other words, in application of lacquers and the like, special formulas can be employed or agents introduced, which will materially increase the properties or characteristics of the coating when applied to the surface, by reason of having a predetermined control temperature on this material when applied.

In other uses of the apparatus, the same may be utilized simply as a medium to heat-treat a substance of any type or kind, capable of circulation through heating coils, in the manner described. In some instances, recirculation can be provided for a predetermined time period in characterizing or processing the fluid.

Considering the accompanying drawing, it will be understood that a fluid can be circulated through the coil 42 to the gun 45, but not discharged therefrom, and then back to the tank 41 through the pipe 61 and pipe 60. This would be desirable in initially starting the use of the apparatus in order to bring the circulated fluid at a desired temperature before discharged at the gun 45. Thus it will be apparent that in processing certain types of fluid mediums, the gun 45 can simply be regarded as a discharge medium from which the circulated material can be discharged when heated or processed to a predetermined degree.

It will also appear that we have provided between the pipe 55 and the pipe 50, a by-pass pipe 84, in which is arranged a control valve 85. This by-pass is employed to control the temperature of the air supplied to the discharge medium, such for example, as the gun 45. The circulated heated air supplied to the gun, may at times, be at too high a temperature to attain the effective results when discharged, thus a percentage of cold air from the source of air supply can be by-passed through the pipe 84 and injected into the heated air, supplied to the gun, to lower the temperature. In this way, a further control is provided on the fluid medium which is discharged. In other words, with some fluids, it may be desirable to use a cooler blast of air in discharging the fluid onto a surface or article.

Having fully described our invention, what we claim as new and desire to secure by Letters Patent is:

1. In apparatus of the character described, an outer casing, an inner casing spaced from the outer casing, insulation in the space between said casings, both casings being open at the top, a cover for closing the open ends of said casings, a fluid circulating coil in the chamber of the inner casing, side walls of said casings and the insulation therebetween having registering openings exposed to said chamber of the inner casing, means in said openings for supporting a circulating pump on the inner casing for exposure to said inner chamber, said coil being coupled with said pump for circulating a fluid through the coil, a tank within the lower portion of said chamber, said chamber and tank containing heat transfer fluids, means in the side walls of said casings for mounting an electric heating element to extend into said tank to heat the fluid in said tank, and means exposed to the chamber of the inner casing for controlling temperature of the fluid therein and of the fluid circulated through said coil.

2. In apparatus of the character described, an outer casing, an inner casing spaced from the outer casing, insulation in the space between said casings, both casings being open at the top, a cover for closing the open ends of said casings, a fluid circulating coil in the chamber of the inner casing, side walls of said casings and the insulation therebetween having registering openings exposed to said chamber of the inner casing, means in said openings for supporting a circulating pump on the inner casing for exposure to said inner chamber, said coil being coupled with said pump for circulating a fluid through the coil, a tank within the lower portion of said chamber, said chamber and tank containing heat transfer fluids, means in the side walls of said casings for mounting an electric heating element to extend into said tank to heat the fluid in said tank, means exposed to the chamber of the inner casing for controlling temperature of the fluid therein and of the fluid circulated through said coil, an electric motor for driving said pump, and means for supporting the motor on a lower portion of said outer casing.

3. In apparatus of the character described, an outer casing, an inner casing spaced from the outer casing, insulation in the space between said casings, both casings being open at the top, a cover for closing the open ends of said casings, a fluid circulating coil in the chamber of the inner casing, side walls of said casings and the insulation therebetween having registering openings exposed to said chamber of the inner casing, means in said openings for supporting a circulating pump on the inner casing for exposure to said inner chamber, said coil being coupled with said pump for circulating a fluid through the coil, a tank within the lower portion of said chamber, said chamber and tank containing heat transfer fluids, means in the side walls of said casings for mounting an electric heating element to extend into said tank to heat the fluid in said tank, means exposed to the chamber of the inner casing for controlling temperature of the fluid therein and of the fluid circulated through said coil, an electric motor for driving said pump, means for supporting the motor on a lower portion of said outer casing, another coil arranged in the chamber of said inner casing, and means for circulating air, under pressure, through said coil.

4. In apparatus of the character described, an outer casing, an inner casing insulated from the outer casing, both casings being open at the top, a cover for closing the open ends of said casings, a fluid circulating coil in the chamber of the inner casing, said casings having registering openings exposed to said chamber of the inner casing, means in said opening for supporting a circulating pump in the casing for exposure to said inner chamber, said coil being coupled with said pump for circulating a fluid through the coil, a tank within the lower portion of said chamber, said chamber and tank containing heat transfer fluids, means in the walls of said casings for mounting an electric heating element to extend into said tank to heat the fluid in said tank, means exposed to the chamber of the inner casing for controlling temperature of the fluid therein and of the fluid circulated through said coil, an electric motor for driving said pump, means for supporting the motor on a lower portion of said outer casing, another coil arranged in the chamber of said inner casing, means for circulating air, under pressure, through said coil, said fluid coil having a discharge extending through the cover of said casing, and means for by-passing air from the supply to said air coil to the discharge of the air coil in controlling temperature of air at the point of discharge thereof.

5. An apparatus of the character described comprising an insulated casing in which is a heat transfer chamber, a fluid circulating coil in said chamber, means for heating a fluid in the transfer chamber, said means comprising a sealed fluid chamber in which an electric heating element is arranged, electrical means exposed to the heat transfer chamber to control temperatures therein, a pump for circulating fluid through said coil, said pump being mounted in the casing for exposure to the heat transfer chamber thereof to maintain predetermined temperatures at the pump in circulation of fluid through the pump and through said coil, another coil arranged in said transfer chamber, means for passing air, under pressure, through said last named coil, and means in said last named means for by-passing air to the discharge end of the air coil outwardly of the casing in control of the temperature of air at a point of discharge.

6. In apparatus for preheating fluids and for directing heated air to a fluid at a point of discharge, said apparatus comprising an insulated casing, air and fluid coils arranged in the chamber of said casing and heated by a heat transfer medium disposed in said chamber, means within said chamber and spaced from said coil for heating the heat transfer medium, said means comprising a sealed container opening through one side of said casing, an electric heating element mounted in said container to heat a fluid in heating the transfer medium of said chamber, a pump for circulating fluid through the fluid coil, and said pump being mounted in the side of the casing for exposure to the chamber thereof, whereby fluid in the pump is maintained at a temperature substantially equal to the temperature of the fluid in said coil.

7. In apparatus for preheating fluids and for directing heated air to a fluid at a point of discharge, said apparatus comprising an insulated casing, air and fluid coils arranged in the chamber of said casing and heated by a heat transfer medium disposed in said chamber, means within said chamber and spaced from said coil for heating the heat transfer medium, said means comprising a sealed container opening through one side of said casing, an electric heating element mounted in said container to heat a fluid in heating the transfer medium of said chamber, a pump for circulating fluid through the fluid coil, said pump being mounted in the side of the casing for exposure to the chamber thereof, whereby fluid in the pump is maintained at a temperature substantially equal to the temperature of the fluid in said coil, the upper end of the casing being open, means providing an insulated closure for the open end of the casing, and said fluid coil having a discharge passing through said last named means.

8. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber and spaced from and independent of said coil, said unit having a tubular portion fixed to the inner casing and free from the outer casing, and means extending through the outer casing into said tubular portion for electrically heating said unit.

9. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber and spaced from and independent of said coil, said unit having a tubular portion fixed to the inner casing and free from the outer casing, means extending through the outer casing into said tubular portion for electrically heating said unit, a thermo-switch for controlling the operation of said last named means, and means fixed to the inner casing and passing through the outer casing for mounting the thermo-switch for exposure to the chamber of the inner casing.

10. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber and spaced from and independent of said coil, said unit having a tubular portion fixed to the inner casing and free from the outer casing, means extending through the outer casing into said tubular portion for electrically heating said unit, a thermo-switch for controlling the operation of said last named means, means fixed to the inner casing and passing through the outer casing for mounting the thermo-switch for exposure to the chamber of the inner casing, and means detachably supporting the pump in connection with said casings.

11. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber and spaced from and independent of said coil, said unit having a tubular portion fixed to the inner casing and free from the outer casing, means extending through the outer casing into said tubular portion for electrically heating said unit, a thermo-switch for controlling the operation of said last named means, means fixed to the inner casing and passing through the outer casing for mounting the thermo-switch for exposure to the chamber of the inner casing, another coil in the chamber of the inner casing, and said last named coil having an outlet extending through said casing.

12. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber, said unit having a tubular portion fixed to the inner casing and free from the outer casing, means extending through the outer casing into said tube for electrically heating said unit, a thermo-switch for controlling the operation of said last named means, means fixed to the inner casing and passing through the outer casing for mounting the thermo-switch for exposure to the chamber of the inner casing, another coil in the chamber of the inner casing, said last named coil having an outlet extending through said casing, and means extending through said closure means for introducing a fluid medium into said chamber and said heating unit.

13. In preheating apparatus of the character described, inner and outer casings with insulation therebetween, both casings being open at the top, means forming a closure for the open end of said casing, a fluid circulating coil arranged in the chamber of the inner casing and having an outlet passed through said last named means, means exposed to said chamber for circulating a fluid through said coil, a heating unit arranged in said chamber, said unit having a tubular portion fixed to the inner casing and free from the outer casing, means extending through the outer casing into said tube for electrically heating said unit, a thermo-switch for controlling the operation of said last named means, means fixed to the inner casing and passing through the outer casing for mounting the thermo-switch for exposure to the chamber of the inner casing, another coil in the chamber of the inner casing, said last named coil having an outlet extending through said casing, means extending through said closure means for introducing a fluid medium into said chamber and said heating unit, and means extending through said closure means for venting said chamber and unit.

ABRAHAM A. ARVINTZ.
NATHAN A. ARVINS.
ROBERT A. ARVINTZ.

REFERENCES CITED

The following references are of record in the file of this patent:

UNITED STATES PATENTS

| Number | Name | Date |
|---|---|---|
| 1,277,621 | Macklind | Sept. 3, 1918 |
| 1,560,528 | Baum | Nov. 10, 1925 |
| 2,175,307 | Peck | Oct. 10, 1939 |